US011401045B2

(12) United States Patent
Omer et al.

(10) Patent No.: US 11,401,045 B2
(45) Date of Patent: Aug. 2, 2022

(54) CAMERA BALL TURRET HAVING HIGH BANDWIDTH DATA TRANSMISSION TO EXTERNAL IMAGE PROCESSOR

(75) Inventors: Tom Omer, Moorpark, CA (US); Thomas Szarek, Simi Valley, CA (US); Jefferson C. McBride, Simi Valley, CA (US)

(73) Assignee: AEROVIRONMENT, INC., Monrovia, CA (US)

( * ) Notice: Subject to any disclaimer, the term of this patent is extended or adjusted under 35 U.S.C. 154(b) by 0 days.

(21) Appl. No.: 13/220,535

(22) Filed: Aug. 29, 2011

(65) Prior Publication Data

US 2013/0050487 A1 Feb. 28, 2013

(51) Int. Cl.
*B64D 47/08* (2006.01)
*H04N 7/18* (2006.01)
*H04N 5/232* (2006.01)

(52) U.S. Cl.
CPC .......... *B64D 47/08* (2013.01); *H04N 5/23206* (2013.01); *H04N 7/185* (2013.01); *B64C 2201/127* (2013.01)

(58) Field of Classification Search
CPC .............. B64D 47/08; B64C 2201/127; H04N 5/2251; H04N 7/185
USPC ........................................ 348/144, 85, 135
See application file for complete search history.

(56) References Cited

U.S. PATENT DOCUMENTS

| 3,638,502 A | 2/1972 | Leavitt et al. |
| 4,217,606 A | 8/1980 | Nordmann |
| 4,855,823 A | 8/1989 | Struhs et al. |
| 5,153,623 A | 10/1992 | Bouvier |
| 5,251,118 A | 10/1993 | Budnovitch et al. |
| 5,383,645 A | 1/1995 | Pedut et al. |
| 5,897,223 A | 4/1999 | Tritchew et al. |
| 5,936,245 A | 8/1999 | Goillot et al. |
| 6,056,237 A | 5/2000 | Woodland |
| 6,147,701 A | 11/2000 | Tamura et al. |
| 6,226,125 B1 | 5/2001 | Levy et al. |
| D452,697 S | 1/2002 | Fallowfield et al. |
| 6,366,311 B1 | 4/2002 | Monroe |
| 6,529,620 B2 | 3/2003 | Thompson |
| 6,628,338 B1 | 9/2003 | Elberbaum et al. |

(Continued)

FOREIGN PATENT DOCUMENTS

| CN | 201099352 Y | 8/2008 |
| CN | 101766049 A | 6/2010 |

(Continued)

OTHER PUBLICATIONS

Office Action in U.S. Appl. No. 13/220,617 dated Dec. 4, 2012.

(Continued)

*Primary Examiner* — Dave Czekaj
*Assistant Examiner* — Berteau Joisil
(74) *Attorney, Agent, or Firm* — Nixon Peabody LLP; Jeffrey L. Costellia

(57) ABSTRACT

An unmanned aerial vehicle (UAV) includes a fuselage, a gimbal-mounted turret having one or more degrees of freedom relative to the fuselage, a camera disposed in the gimbal-mounted turret for motion therewith in the one or more degrees of freedom, and a central video image processor disposed exteriorly of the gimbal-mounted turret, the central video image processor configured to receive and process image data from the camera.

15 Claims, 6 Drawing Sheets

(56) References Cited

U.S. PATENT DOCUMENTS

| | | |
|---|---|---|
| 7,000,883 B2 | 2/2006 | Mercadal et al. |
| 7,049,953 B2 | 5/2006 | Monroe |
| 7,058,721 B1 | 6/2006 | Ellison et al. |
| 7,131,136 B2 | 10/2006 | Monroe |
| 7,173,526 B1 | 2/2007 | Monroe |
| 7,253,398 B2 | 8/2007 | Hughes et al. |
| 7,280,810 B2 | 10/2007 | Feher |
| 7,359,622 B2 | 4/2008 | Monroe et al. |
| 7,400,348 B2 | 7/2008 | Hoyos |
| 7,526,183 B2 | 4/2009 | Takahashi et al. |
| 7,561,037 B1 | 7/2009 | Monroe |
| 7,634,662 B2 | 12/2009 | Monroe |
| 7,695,647 B2 | 4/2010 | Smela et al. |
| 7,747,364 B2 | 6/2010 | Roy et al. |
| 7,955,006 B1 | 6/2011 | Harvey |
| 8,091,833 B2 | 1/2012 | von Flotow et al. |
| 8,137,007 B1 | 3/2012 | Harvey |
| 8,140,200 B2 | 3/2012 | Heppe et al. |
| 8,174,612 B1 | 5/2012 | Koehler |
| D662,120 S | 6/2012 | Deuwaarder |
| 8,226,039 B2 | 7/2012 | von Flotow et al. |
| D668,701 S | 10/2012 | Ohno et al. |
| 8,523,462 B2 | 9/2013 | Dimotakis |
| 8,559,801 B2 | 10/2013 | Dimotakis |
| 8,589,994 B2 | 11/2013 | Monroe |
| 8,767,041 B2 | 7/2014 | Yun et al. |
| 8,891,539 B2 | 11/2014 | Ozawa |
| 2001/0043751 A1 | 11/2001 | Takahashi et al. |
| 2002/0145678 A1* | 10/2002 | Suzuki .............. H04N 9/64 348/675 |
| 2003/0067542 A1 | 4/2003 | Monroe |
| 2003/0099457 A1 | 5/2003 | Takahashi et al. |
| 2004/0026573 A1 | 2/2004 | Andersson et al. |
| 2004/0068583 A1 | 4/2004 | Monroe et al. |
| 2004/0173726 A1 | 9/2004 | Mercadal et al. |
| 2004/0230352 A1 | 11/2004 | Monroe |
| 2005/0219639 A1 | 10/2005 | Fujise et al. |
| 2006/0033288 A1 | 2/2006 | Hughes et al. |
| 2006/0110155 A1 | 5/2006 | Kouchi et al. |
| 2006/0231675 A1 | 10/2006 | Bostan |
| 2007/0031151 A1* | 2/2007 | Cunningham ..... H04B 10/1123 398/131 |
| 2008/0204553 A1 | 8/2008 | Thompson |
| 2008/0205696 A1 | 8/2008 | Thompson |
| 2008/0215204 A1 | 9/2008 | Roy et al. |
| 2008/0267612 A1 | 10/2008 | Harvey |
| 2008/0277631 A1 | 11/2008 | Smela et al. |
| 2008/0316313 A1 | 12/2008 | Monroe et al. |
| 2009/0015674 A1 | 1/2009 | Alley et al. |
| 2009/0216394 A1 | 8/2009 | Heppe et al. |
| 2009/0218447 A1 | 9/2009 | von Flotow et al. |
| 2009/0273671 A1 | 11/2009 | Gardner |
| 2009/0284644 A1 | 11/2009 | McKaughan et al. |
| 2010/0013628 A1 | 1/2010 | Monroe |
| 2010/0110162 A1 | 5/2010 | Yun et al. |
| 2010/0141503 A1 | 6/2010 | Baumatz |
| 2010/0241931 A1 | 9/2010 | Choi et al. |
| 2010/0265329 A1 | 10/2010 | Doneker |
| 2010/0309344 A1 | 12/2010 | Zimmer et al. |
| 2011/0103021 A1 | 5/2011 | Janssen et al. |
| 2011/0170556 A1 | 7/2011 | Ozawa |
| 2012/0104169 A1 | 5/2012 | von Flotow et al. |
| 2012/0106800 A1 | 5/2012 | Khan et al. |
| 2012/0200703 A1* | 8/2012 | Nadir .............. G02B 27/644 348/144 |
| 2012/0320203 A1* | 12/2012 | Liu .............. G01C 11/04 348/144 |
| 2013/0048792 A1 | 2/2013 | Szarek et al. |
| 2013/0050486 A1 | 2/2013 | Omer et al. |
| 2013/0050487 A1 | 2/2013 | Omer et al. |
| 2013/0051778 A1 | 2/2013 | Dimotakis |
| 2013/0051782 A1 | 2/2013 | Dimotakis |
| 2013/0135471 A1 | 5/2013 | Giuffrida et al. |
| 2014/0161435 A1 | 6/2014 | Dimotakis |

FOREIGN PATENT DOCUMENTS

| | | |
|---|---|---|
| TW | 211058 | 8/1993 |
| TW | I311121 B | 6/2009 |
| WO | WO 2013/074172 A2 | 5/2013 |
| WO | WO 2013/074173 A2 | 5/2013 |
| WO | WO 2013/074175 A1 | 5/2013 |
| WO | WO 2013/074176 A1 | 5/2013 |
| WO | WO 2013/074177 A2 | 5/2013 |

OTHER PUBLICATIONS

Office Action in U.S. Appl. No. 13/220,562 dated Nov. 23, 2012.
PCT International Search Report and Written Opinion in International Application No. PCT/US12/52727, dated Mar. 18, 2013.
PCT International Search Report and Written Opinion in International Application No. PCT/US12/52728. , dated Mar. 19, 2013.
PCT International Search Report and Written Opinion in International Application No. PCT/US12/52723, dated May 3, 2013.
PCT International Search Report and Written Opinion in International Application No. PCT/US12/52725, dated May 3, 2013.
PCT International Search Report and Written Opinion in International Application No. PCT/US12/52729, dated May 13, 2013.
Notice of Allowance in U.S. Appl. No. 13/220,562, dated May 1, 2013.
Notice of Allowance in U.S. Appl. No. 13/220,617, dated Jun. 10, 2013.
Office Action and Search Report in TW Application No. 101130827 dated Feb. 12, 2015, 14 pages.
Notice of Allowance for U.S. Appl. No. 13/967,720, dated Mar. 25, 2015.
Notice of Allowance for U.S. Appl. No. 13/220,619, dated Mar. 6, 2015.
Office Action in U.S. Appl. No. 13/220,197, dated Nov. 7, 2013.
Final Office Action in U.S. Appl. No. 13/220,197, dated Jun. 2, 2014.
Office Action in U.S. Appl. No. 13/220,619, dated May 13, 2014.
Final Office Action in U.S. Appl. No. 13/220,619, dated Oct. 8, 2014.
Office Action and Search Report in Taiwanese Application No. 101130829, dated May 14, 2014.
Office Action in Taiwanese Application No. 101130829, dated Sep. 29, 2014.
Office Action and Search Report in Taiwanese Application No. 101130830 dated Oct. 30, 2014.
Office Action in U.S. Appl. No. 13/967,720, dated Oct. 8, 2014.
Office Action and Search Report in Taiwanese Application No. 101130828, dated Nov. 11, 2014.
Taiwanese Office Action and Search Report for TW 101130832, dated Jun. 26, 2015.
Office Action in U.S. Appl. No. 13/220,535, dated Aug. 2, 2013, 10 pages.
Office Action in U.S. Appl. No. 13/220,619, dated Dec. 9, 2013 (restriction), 8 pages.
Office Action in U.S. Appl. No. 13/220,619, dated Oct. 8, 2014, 11 pages.
Office Action and Search Report in Taiwanese Application No. 101130828, dated Nov. 11, 2014, 24 pages.
Office Action, dated Aug. 21, 2015, in Taiwanese Application No. 101130827.
Office Action, dated Jun. 10, 2016, issued in U.S. Appl. No. 15/010,445, 31 pages.
Office Action, dated Jun. 21, 2016, issued in Taiwanese Patent Application No. 105113973, 8 pages.

* cited by examiner

CAMERA BALL TURRET HAVING HIGH BANDWIDTH DATA TRANSMISSION TO EXTERNAL IMAGE PROCESSOR

TECHNICAL FIELD

The present disclosure relates generally to camera-equipped aircraft, for example unmanned aerial vehicles used for surveillance.

BACKGROUND

Aerial surveillance is an invaluable information-gathering tool. In battle settings, it provides intelligence about troop size, location, and movement, damage assessment, and a host of factors that are critical to successful battle planning and prosecution. Various aircraft-mounted cameras can be used to provide the information in real time, in the form of still or moving (video) images, over a range of spectra including infrared for penetrating through visibility barriers such as haze and for night time operation. The cameras can be fixed or movable, individually or collectively, relative to the aircraft. Gimbaled mechanisms effect camera movement, and generally comprise a turret typically having two degrees of freedom relative to the aircraft. Motion of the turret-mounted camera can be automated, for example in a preset scanning pattern, or user-actuated depending on the specific application. For example, the operator can move or zoom the camera to concentrate attention on a particular area of interest, to capture higher resolution images, or to scan over a broad region in order to detect activity that warrants greater scrutiny, either in real time or during subsequent analysis of the images. Information gathered through surveillance can be processed locally, onboard the aircraft, or transmitted to remote operation centers.

FIG. 1 is a bottom view of an aircraft 100 on which a gimbaled turret 102 is mounted. Disposed in the turret is a camera 104 whose mounting provides it with the two degrees of movement indicated by the pair of double-headed arrows in the drawing.

In addition to conventional manned aircraft, unmanned aerial vehicles, or UAVs, have gained widespread acceptance in the war theater. A primary advantage of UAVs is their pilotless nature, which reduces exposure and risk to human life during operation. The absence of a pilot and other human operators, with their attendant support systems, means the UAV can be made smaller, and payload can be dedicated to other components, such as armament and surveillance equipment. However, as reduced size becomes paramount, more exacting constraints are imposed. Among these are weight and range considerations, which translate to requirements of improved aerodynamics and compactness. For these reasons, UAV-mounted cameras need to be smaller and lighter in order to conserve power and range. Further, because of their exterior mounting, their design needs to present less drag or wind resistance to the aircraft.

FIG. 2 is a schematic view of a conventional turret-mounted camera used in a UAV. Some details of the camera include main optical components (lenses, etc.) 202, a sensor 204, and video processing circuit 206. All of these components are mounted within ball turret 102. Processed image information from the camera is delivered from the ball turret 102 to a transmitter (not shown) disposed in the fuselage of the aircraft. The means of transmission between the camera and transmitter can include cables 208 or other expedients, such as slip rings (not shown), that are designed to eliminate interference with the motion of the ball turret while contending with the large throughput of information necessary to support high resolution still or moving images. Transmission from the fuselage to the ground station is wireless, for example via RF.

SUMMARY

As described herein, an unmanned aerial vehicle (UAV) includes a fuselage, a gimbal-mounted turret having one or more degrees of freedom relative to the fuselage, a camera disposed in the gimbal-mounted turret for motion therewith in the one or more degrees of freedom, and a central video image processor disposed exteriorly of the gimbal-mounted turret, the central video image processor configured to receive and process image data from the camera.

Also as described herein, a surveillance method includes capturing image information using a gimbaled camera mounted in a turret exterior to an aircraft fuselage, transmitting the captured image information to a central image processor disposed in the aircraft fuselage, and processing the transmitted captured image information in the central image processor.

Also as described herein, a device includes means for capturing image information using a gimbaled camera mounted in a turret exterior to an aircraft fuselage, means for transmitting the captured image information to a central image processor disposed in the aircraft fuselage, and means for processing the transmitted captured image information in the central image processor.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a camera ball turret having high bandwidth data transmission to external image processor. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1:
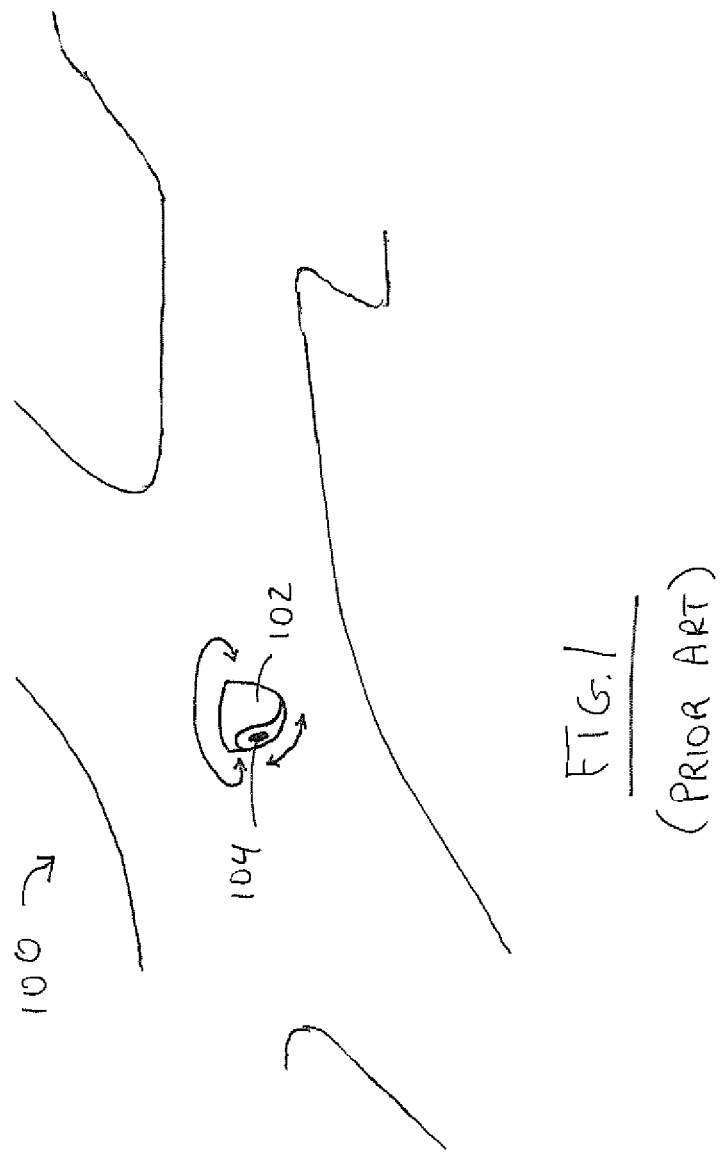
FIG. 1 is a bottom view of a conventional manned aircraft having a gimbaled ball turret in which a camera is mounted.
Figure 2:
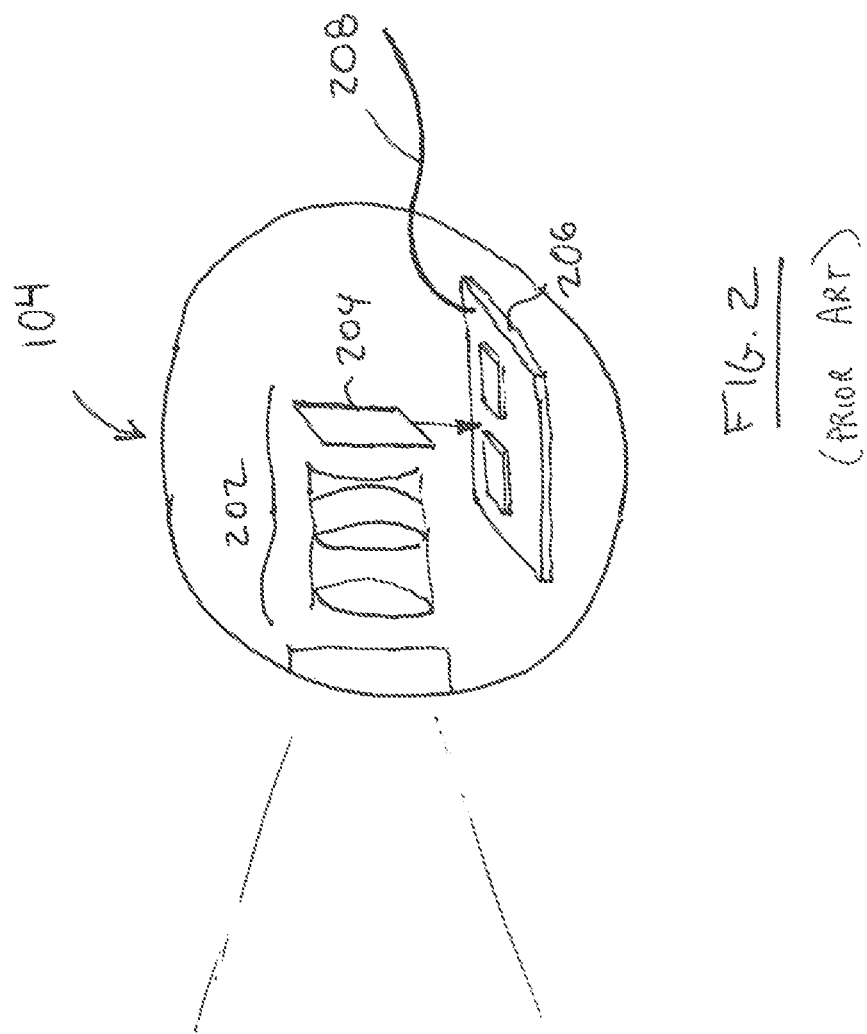
FIG. 2 is a schematic view of a conventional gimbaled turret-mounted camera with some details thereof.
Figure 3:
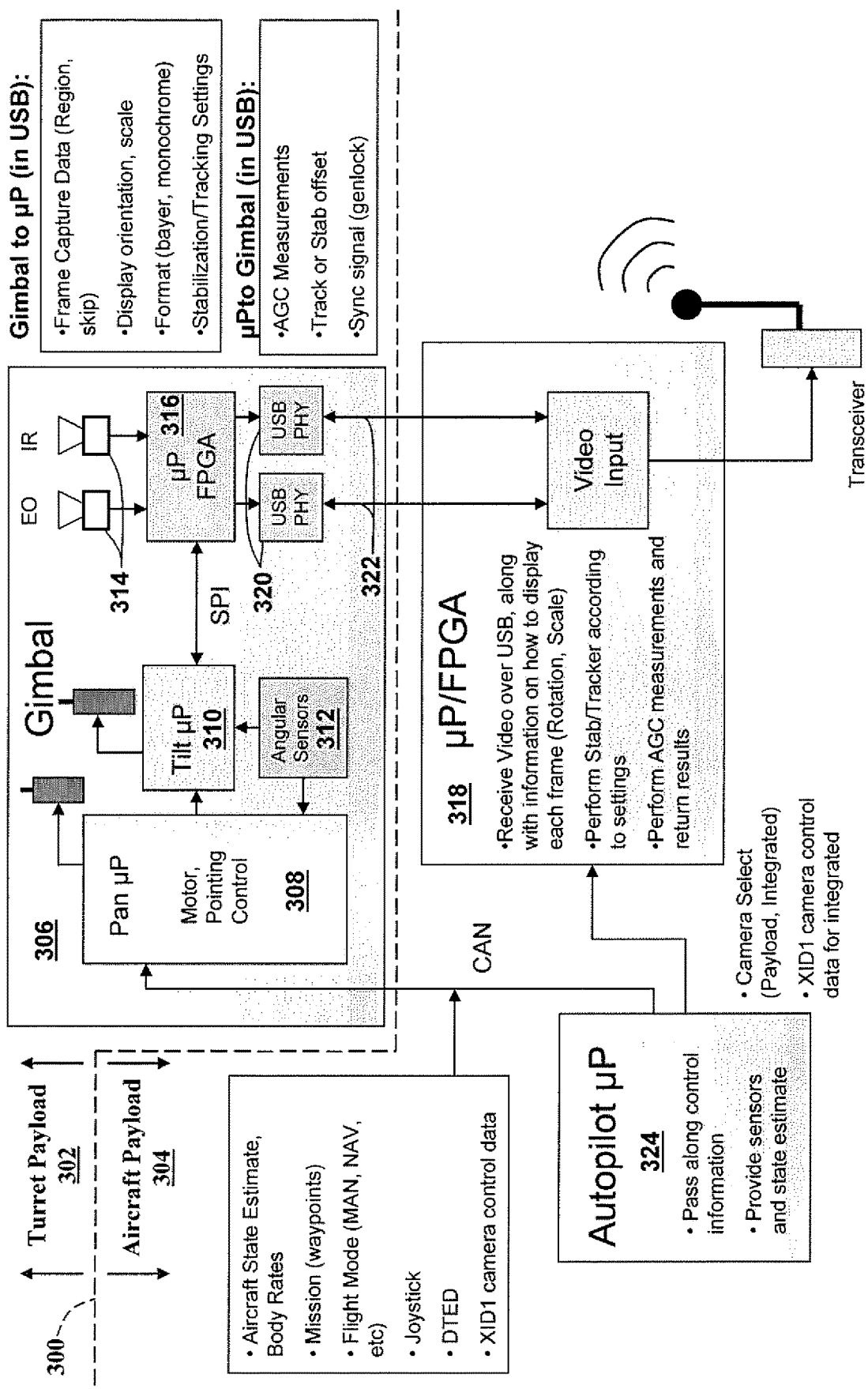
FIG. 3 is a block diagram of the system architecture for a UAV in accordance with one embodiment described herein.

FIG. 3 is a block diagram of the system architecture for a UAV in accordance with one embodiment. The dashed line 300 demarks the separation between the turret payload 302 versus the aircraft or fuselage payload 304. The turret payload 302 includes the camera optics, which are not shown for simplicity. The turret payload 302 also includes the gimbal mechanism 306, responsible for moving the camera optics through a range of azimuthal and elevational angles. Motion is effected using pan and tilt microprocessors and motors 308 and 310 in conjunction with angular sensors 312 that provide feedback and control for these mechanisms. EO (electro-optical) and IR (infrared) detectors 314 provide sensed information to a circuit 316, comprised of an FPGA for instance, for serializing the data and for interfacing with the detectors, for example providing instructions regarding size and orientation of frames to be grabbed, commands for AGC measurement, track or stab (stabilization) offsets, and synchronization signals. Track and stab offsets are parameters which affect the region of the detectors that is captured and returned in video, and are commands that can be generated in video processing on the fuselage. Stabilization is an approach for matching a frame with a previous frame in order to remove unintentional movements, with the effect of keeping objects in the video stationary.

Figure 4:
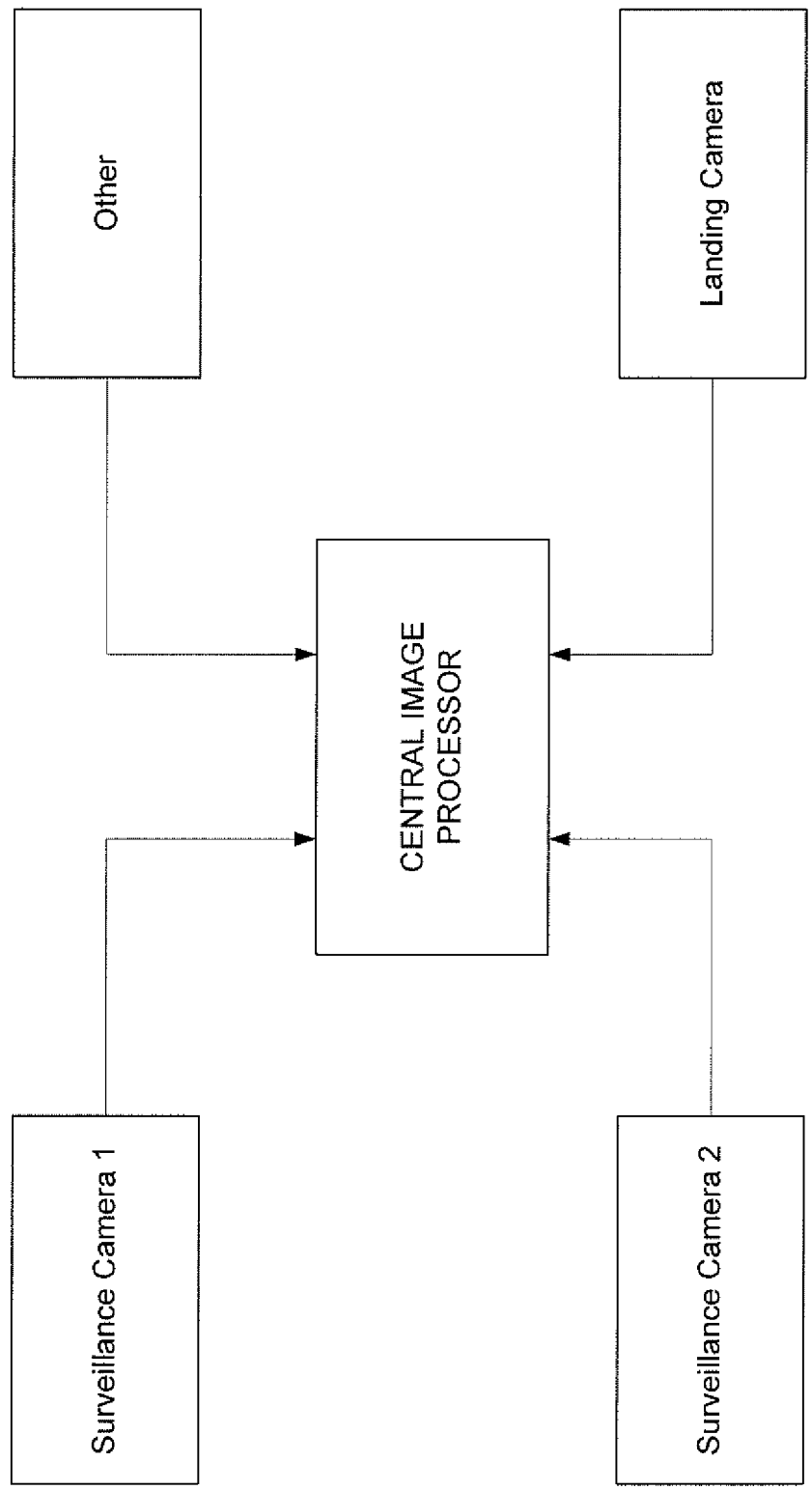
FIG. 4 is a block diagram showing a centralized image capture approach.

The output of circuit 316 is transmitted out of the turret into the aircraft. The turret payload 302 can contain other hardware and circuit components for operating the camera such as for manipulation and control of frame capture, display orientation, scale, format (bayer, monochrome), image stabilization/tracking, AGC measurement, track or stab offset, and synchronization signals. However, the bulk of the video image processing is performed not by circuitry in the turret payload 302, as in prior art approaches, but by circuits that are disposed in the aircraft itself, as part of the aircraft or fuselage payload 304. This reduces the weight of the turret and its size and commensurate drag, also reducing the amount of heat generated in the turret, wherein limited heat management measures are available, particularly due to the requirement of water-proofing because of weather exposure. In addition, the size and power (and heat) of the motors required to actuate the turret in the various degrees of freedom are reduced, because the weight and the size of the turret is reduced. The reduction in weight reduces the inertia of the turret and as such a lighter turret can be turned as fast by smaller motors or faster with the same motors. In addition, costs are reduced by piggy-backing some or all of the video processing onto existing electronics in the aircraft, eliminating redundant components previously found in both the aircraft and the turret. Further, by centralizing the video image processing onto one location in the aircraft, data from cameras other than those on the turret can be delivered to the centralized location for processing, reducing redundancy, cost and weight, and possibly drag, even more. Because the UAV is battery operated, these reductions directly impact the airtime (e.g. flight mission time) and performance of the aircraft and are critical, outcome determinative factors. The centralized approach is depicted in the block diagram of FIG. 4, which shows a central image processor collecting and processing information from multiple cameras including a landing camera and surveillance cameras 1 and 2. Only a single, central image processor is required for these multiple cameras, compounding the size, weight and cost savings. Another advantage of this approach is the standardization of the image processing, enabling interchangeability of the optics of each of the multiple cameras. Thus the optical components of the camera in the turret for example can be readily swapped out for more specialized optical functionality—that is, higher power magnification or zoom functionality, for instance—without the need to replace the image processing circuitry as well, or to reconfigure the processing algorithms and protocols as would be necessary if the image processing circuitry had to be replaced with the optics. It should be noted that a surveillance and a landing camera may not be operative at the same time as the tasks associated with each are different and separate. Therefore separate video processing functionality at each camera may not be necessary, and can be staggered over time for the two types of cameras. This is also true of the IR and EO cameras, which are often not operated simultaneously, and their use of processing equipment can also be staggered, so that they can both share the same equipment.

Returning to FIG. 3, central video image processor 318 is shown configured to receive image data and other information from EO and IR detectors 314 delivered by way of physical USB connections 320 and communication channels 322. The communication channels 322 may be selected from various types of connections, including but not limited to twisted pair conductors, coaxial cables, slip rings, or even wireless connections. The type of connection used may be a function of the data bandwidth and the amount of compression that is applied before transmission. Raw, uncompressed data requires minimal processing and can therefore help reduce the size of the turret. However, the transmission of raw data imposes the highest bandwidth requirements, and the transmission path would be configured accordingly, using coaxial or even optical cables for example. The received image data and other information is processed by central video image processor 318, whose functions may include, but are not limited to, obtaining raw or partially conditioned data from the detectors 314, obtaining information on how to display individual frames, including rotating and scaling information, performing stabilization and/or tracking, and performing AGC (automatic gain control) measurements and providing results thereof. Central video image processor 318 is also configured to receive non-image related information, such as that from autopilot microprocessor 324. Some or all of this non-image related information is additionally provided to gimbal 306, augmented with other information relating to aircraft state estimates, body rates, mission information, flight mode information, joystick/control information, DTED (ground elevation data used by the payload to estimate where it should be pointing) information and camera control data. Modules (not shown) of central video image processor 324 that can perform the above and other functionalities can include a de-mosaicing module, video conditioning module (for color correction, white balance, saturation, and contrast, for instance), individual frame display information module that provides information on rotating, scaling and offset, and template matching module for stabilization and tracking, and video compression.

Figure 5:
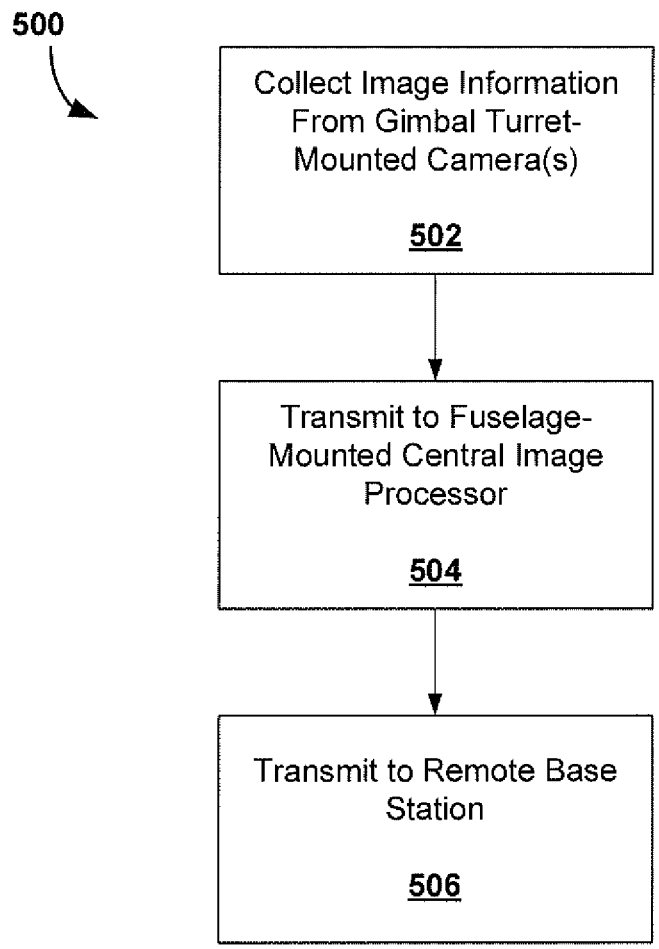
FIG. 5 is a flow diagram of a surveillance process.
Figure 6:
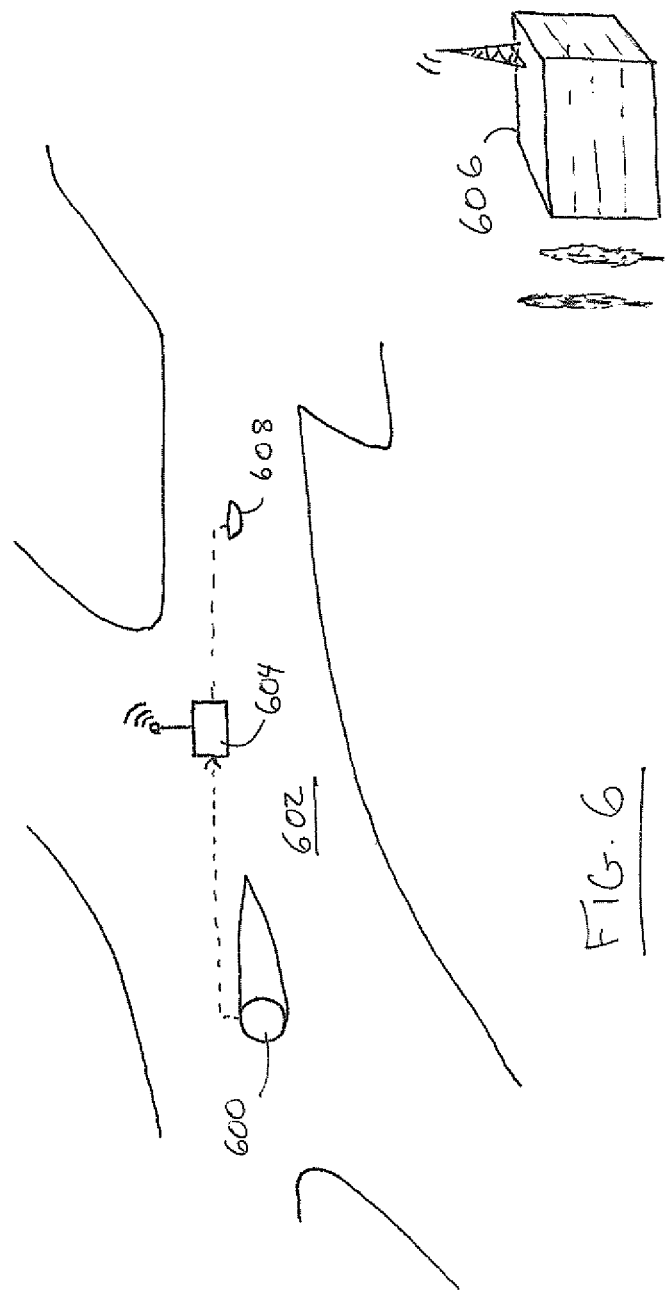
FIG. 6 is a schematic diagram showing the surveillance operation of a multi-camera UAV in communication with a remote base station.

A surveillance method 500 in accordance with one embodiment is described with reference to FIGS. 5 and 6. In this method, at 502, a gimbaled camera 600 (FIG. 6) mounted in a turret exterior to an aircraft fuselage 602 is used to collect image information. The image information is then transmitted, at 504, to a central image processor 604 disposed in the aircraft fuselage. Optionally, this processed image is then transmitted to a remote base station 606 at 506. A second, landing camera 608 also transmits its image information to central image processor 604, and, optionally, to remote base station 606. Although the landing camera is shown on the underside of the fuselage, it could be disposed in other locations, for example the top side of the fuselage, for UAVs configured to land "upside down."

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. An unmanned aerial vehicle (UAV) comprising:
a fuselage having a fuselage payload including:
a central video image processor configured to receive and process image data, the central video image processor including:
a de-mosaicing module,
a video conditioning module configured to modify at least one of color correction, white balance, saturation, and contrast,
an individual frame display information module configured to provide information on at least one of rotating, scaling, and offset, and
a template matching module for at least one of stabilization, tracking, and video compression; and
an autopilot microprocessor coupled to the central video image processor to relay non-image related information; and
a gimbal-mounted turret having a turret payload that is separate from the fuselage payload, the gimbal-mounted turret coupled to the fuselage such that the turret payload has one or more degrees of freedom relative to the fuselage payload, the turret payload including:
a camera coupled to the central video image processor to supply the image data;
one or more motors;
one or more angular sensors; and
a motion microprocessor coupled to the autopilot microprocessor and the one or more angular sensors, the motion microprocessor further coupled to the one or more motors to effect motion of the camera, wherein motion of the camera with respect to the fuselage payload that is effected by the one or more motors results in motion of the turret payload with respect to the central video image processor.

2. The UAV of claim 1, further comprising an additional camera coupled to the fuselage such that the additional camera is external to the turret payload, the additional camera being coupled to the central video image processor to supply additional image data, the central video image processor configured to receive and process the additional image data from the additional camera.

3. The UAV of claim 1, wherein the additional camera is a landing camera.

4. A surveillance method comprising:
capturing image information using a gimbaled camera mounted in a turret payload exterior to an aircraft fuselage;
transmitting the captured image information to a central image processor disposed in the aircraft fuselage, wherein transmitting the captured image information to the central image processor includes passing the captured image information from the turret payload to the aircraft fuselage, and wherein the central video image processor includes:
a de-mosaicing module,
a video conditioning module configured to modify at least one of color correction, white balance, saturation, and contrast,
an individual frame display information module configured to provide information on at least one of rotating, scaling and offset, and
a template matching module for at least one of stabilization, tracking, and video compression;
relaying non-image related information from an autopilot microprocessor disposed in the aircraft fuselage to the central video image processor;
processing the transmitted captured image information in the central image processor; and
moving the turret payload with respect to the aircraft fuselage using one or more motors positioned in the turret payload, wherein moving the turret payload with respect to the fuselage includes moving the turret payload with respect to the central image processor, and wherein moving the turret payload includes receiving feedback data from one or more angular sensors in the turret payload and controlling the one or more motors using a motion microprocessor in the turret payload based on the feedback data.

5. The method of claim 4, further comprising transmitting information processed by the central image processor to a remote location.

6. The method of claim 4, further comprising:
capturing additional image information using an additional camera, the additional camera being mounted exteriorly of the fuselage; and transmitting the captured additional image information from the additional camera to the central image processor, wherein transmitting the captured additional image information includes passing the captured additional information from the additional camera into the aircraft fuselage.

7. A device comprising:
means for capturing image information using a gimbaled camera mounted in a turret payload exterior to an aircraft fuselage;
means for transmitting the captured image information to a central image processor disposed in the aircraft fuselage, wherein the means for transmitting the captured image information to the central image processor includes a means for passing the captured image information from the turret payload to the aircraft fuselage, and wherein the central video image processor includes:
   a de-mosaicing module,
   a video conditioning module configured to modify at least one of color correction, white balance, saturation, and contrast,
   an individual frame display information module configured to provide information on at least one of rotating, scaling and offset, and
   a template matching module for at least one of stabilization, tracking, and video compression;
means for relaying non-image related information from an autopilot microprocessor disposed in the aircraft fuselage to the central video image processor;
means for processing the transmitted captured image information in the central image processor; and
means for effecting motion of the turret payload with respect to the aircraft fuselage, wherein the motion of the turret payload with respect to the aircraft fuselage includes motion of the turret payload with respect to the central image processor, and wherein moving the turret payload includes receiving feedback data from one or more angular sensors in the turret payload and controlling the one or more motors using a motion microprocessor in the turret payload based on the feedback data.

8. The device of claim 7, further comprising means for transmitting information processed by the central image processor to a remote location.

9. The device of claim 7, further comprising:
   means for capturing additional image information using an additional camera mounted exteriorly of the fuselage; and
   means for transmitting the captured additional image information from the additional camera to the central image processor, wherein the means for transmitting the captured additional image information includes a means for passing the captured additional information from the additional camera into the aircraft fuselage.

10. The UAV of claim 2, wherein the additional camera is coupled to the fuselage external to the fuselage payload.

11. The method of claim 6, wherein the additional camera is mounted exteriorly of the fuselage such that the additional camera is external to the turret payload.

12. The device of claim 9, wherein the additional camera is mounted exteriorly of the fuselage such that the additional camera is external to the turret payload.

13. The UAV of claim 1, wherein the gimbal-mounted turret is waterproofed.

14. The method of claim 4, wherein the turret payload is contained within a waterproofed turret.

15. The device of claim 7, wherein the turret payload is contained within a waterproofed turret.

* * * * *